US012393437B1

(12) United States Patent
Sundar et al.

(10) Patent No.: US 12,393,437 B1
(45) Date of Patent: Aug. 19, 2025

(54) METHOD AND APPARATUS FOR SUPPORTING SECURITY IMPLEMENTATION IN A VIRTUAL NETWORK

(71) Applicant: Marvell Asia Pte Ltd, Singapore (SG)

(72) Inventors: Gourangadoss Sundar, Irvine, CA (US); Girish Basrur, Irvine, CA (US); Michael Hernandez, Long Beach, CA (US)

(73) Assignee: Marvell Asia Pte Ltd, Singapore (SG)

( * ) Notice: Subject to any disclaimer, the term of this patent is extended or adjusted under 35 U.S.C. 154(b) by 719 days.

(21) Appl. No.: 17/661,405

(22) Filed: Apr. 29, 2022

Related U.S. Application Data (60) Provisional application No. 63/181,768, filed on Apr. 29, 2021.

(51) Int. Cl.
*G06F 9/455* (2018.01)
*H04L 9/40* (2022.01)
*H04L 65/1069* (2022.01)

(52) U.S. Cl.
CPC ...... *G06F 9/45558* (2013.01); *G06F 9/45533* (2013.01); *H04L 63/0272* (2013.01); *H04L 63/0428* (2013.01); *G06F 2009/45579* (2013.01); *G06F 2009/45587* (2013.01); *G06F 2009/45595* (2013.01); *H04L 65/1069* (2013.01)

(58) Field of Classification Search
None
See application file for complete search history.

(56) References Cited

U.S. PATENT DOCUMENTS

2017/0180318 A1\* 6/2017 Lutas ............... H04L 63/14
2022/0103520 A1\* 3/2022 Chifor ............ H04L 63/0236

\* cited by examiner

*Primary Examiner* — Qing Yuan Wu (57) ABSTRACT

In a virtual network environment including a virtualized host administered by a hypervisor, a first network adapter coupling the host to a storage area network (SAN), an external storage device, and a second network adapter coupling the external storage device to the SAN, where the host includes a first virtual machine, and the first network adapter and the second network adapter are configured to establish an encrypted channel between themselves, for use by a virtual machine to communicate to the external storage device, managing the encrypted channel includes instantiating an additional virtual machine for executing security software, instantiating an emulated storage device associated with the hypervisor, instantiating at the additional virtual machine a respective virtual disk corresponding the emulated storage device, and transferring messages between the security software on the additional virtual machine and the first network adapter by encoding the messages in read/write requests to the virtual disk.

21 Claims, 3 Drawing Sheets

METHOD AND APPARATUS FOR SUPPORTING SECURITY IMPLEMENTATION IN A VIRTUAL NETWORK

CROSS REFERENCE TO RELATED APPLICATION

This disclosure claims the benefit of commonly-assigned U.S. Provisional Patent Application No. 63/181,768, filed Apr. 29, 2021, which is hereby incorporated by reference herein in its entirety.

FIELD OF USE

This disclosure relates to implementation of security software in a virtual network environment. More particularly, this disclosure relates to creation of an emulated device within a virtual network to allow mapping of security requests.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

A virtualized host partitions the resources of a computer system into multiple logical units ("virtual machines") or tenants that could share the underlying hardware and yet operate independently without the awareness of sharing physical resources with other tenants. The entity that enables such partitioning and manages the hardware resources of a computer system among multiple tenants is called a Type 1 hypervisor. When a virtualized host is connected to a storage area network (SAN), the hypervisor may connect a plurality of guest tenants ("virtual machines") to a plurality of "target" storage devices connected to the SAN. Inasmuch as a Type 1 hypervisors is designed to host multiple tenants (virtual machines), each of which could run its own "guest" operating system that runs all of the application workload, a Type 1 hypervisor may not carry a full-support user space to host applications directly.

It is increasingly common to require encryption of data traffic between a computing device and a target storage device in a networked storage environment. While such "encryption of data in flight (EDIF)" typically is performed by the network adapter—e.g., a host bus adapter—that establishes the link between the computing device and the target device, such encryption typically requires the execution of security software to manage the authentication process and configure keys in advance to establish the secure link or session. Execution of such security software typically requires a standard operating system with access to system hardware. Therefore, the software generally cannot be executed in the host bus adapter, nor on the hypervisor, because neither has the necessary resources.

SUMMARY

In accordance with implementations of the subject matter of this disclosure, in a virtual network environment including a virtualized host administered by a hypervisor, at least one first network adapter coupling the virtualized host to a storage area network, at least one external storage device, and a respective second network adapter coupling the at least one external storage device to the storage area network, wherein the virtualized host includes at least a first virtual machine and the first network adapter and the second network adapter are configured to establish an encrypted channel between themselves, for use by any virtual machine of the at least one virtual machine to communicate to an external storage device of the at least one external storage device, a method of managing the encrypted channel includes instantiating on the virtualized host, by the hypervisor, an additional virtual machine for executing security software, instantiating at least one emulated storage device associated with the hypervisor, instantiating at the additional virtual machine a respective virtual disk corresponding to each of the at least one emulated storage device, and transferring messages between the security software on the additional virtual machine and the first network adapter by for a downstream message from the additional virtual machine to the first network adapter, encoding by the additional virtual machine of the downstream message as a data payload of a write request, directing the write request from the additional virtual machine to the respective virtual disk corresponding to a respective emulated storage device of the at least one emulated storage device, recognizing by a transport driver at the hypervisor receipt of the write request at the respective emulated storage device, decoding by the transport driver of the data payload as the downstream message, and transferring the downstream message to the first network adapter, and for an upstream message from the first network adapter to the additional virtual machine, receiving the upstream message by the transport driver from the first network adapter, encoding by the transport driver of the upstream message as a data payload of a response to a read request by the additional virtual machine to the respective virtual disk, reading of the response by the additional virtual machine, and decoding by the additional virtual machine of the data payload of the response.

A first implementation of such a method may further include queuing, in advance, at least one empty read request from the additional virtual machine, to the emulated storage device of the at least one emulated storage device, for transferring an upstream message subsequently originated by the first network adapter.

A first aspect of that first implementation may further include establishing an encrypted channel, between the at least one first network adapter and the respective second network adapter, by directing a request from the additional virtual machine to the hypervisor to establish the encrypted channel, recognizing the request by the transport driver, instructing the first network adapter, by the transport driver, to establish the encrypted channel, directing a credential request from the first network adapter to the security software on the additional virtual machine for encryption credentials to establish the encrypted channel, encoding by the transport driver of the credential request as a data payload of a response to an empty read request of the at least one empty read request, and sending, by the transport driver, the response to the empty read request of the at least one empty read request.

A first instance of that first aspect may further include reading of the response by the additional virtual machine, decoding by the additional virtual machine of the data payload of the response, generating by the additional virtual machine of the encryption credentials, encoding by the additional virtual machine of a message containing the encryption credentials as a data payload of a new write request, directing the new write request from the additional virtual machine to the respective virtual disk of the additional virtual machine, recognizing by the transport driver at the hypervisor receipt of the new write request at a respective emulated storage device corresponding to the respective virtual disk of the additional virtual machine, decoding by the transport driver of the data payload as the encryption credentials, and transferring the encryption credentials to the first network adapter.

In a second implementation of such a method, instantiating on the virtual network, by the hypervisor, an additional virtual machine for executing security software, may include instantiating on the virtual network, by the hypervisor, an additional virtual machine for executing virtual private network software.

In accordance with implementations of the subject matter of this disclosure, a method for configuring a computer system includes configuring a virtualized host, including a hypervisor, on a computing device, coupling a first network adapter to the virtualized host and to a storage area network, coupling a second network adapter to the storage area network and to at least one external storage device, instantiating on the virtualized host, by the hypervisor, at least a first virtual machine, instantiating on the virtual network, by the hypervisor, an additional virtual machine for executing security software, instantiating at least one emulated storage device at the hypervisor, instantiating at the additional virtual machine a respective virtual disk corresponding to each of the at least one emulated storage device, and configuring transfer of messages between the security software on the additional virtual machine and the first network adapter by configuring the additional virtual machine to, for a downstream message from the additional virtual machine to the first network adapter, encode the downstream message as a data payload of a write request, and direct the write request from the additional virtual machine to the respective virtual disk corresponding to a respective emulated storage device of the at least one emulated storage device, configuring a transport driver at the hypervisor to recognize receipt of the write request at the respective emulated storage device, decode the data payload as the downstream message, and transfer the downstream message to the first network adapter, configuring the transport driver to, for an upstream message from the first network adapter to the additional virtual machine, receive the upstream message from the first network adapter, and encode the upstream message as a data payload of a response to a read request by the additional virtual machine to the respective virtual disk, and configuring the additional virtual machine to read the response, and decode the data payload of the response.

A first implementation of such a method may further include configuring the additional virtual machine to queue, in advance, at least one empty read request to the respective virtual disk, for transferring an upstream message subsequently originated by the first network adapter.

A first aspect of that first implementation may further include configuring the additional virtual machine to direct a request to the hypervisor to establish an encrypted channel to an external storage device of the at least one external storage device, and configuring the transport driver to recognize the secure storage access request, and to instruct the first network adapter, via the transport driver, to establish an encrypted channel between the first network adapter and the second network adapter, by directing a credential request from the first network adapter to the security software on the additional virtual machine for encryption credentials to establish the encrypted channel, encoding by the transport driver of the credential request as a data payload of a response to an empty read request of the at least one empty read request, and sending, by the transport driver, the response to the empty read request of the at least one empty read request.

A first instance of that first aspect may further include configuring the additional virtual machine to read the response, decode the data payload of the response, generate the encryption credentials, encode a message containing the encryption credentials as a data payload of a new write request, and direct the new write request to the respective virtual disk of the additional virtual machine.

A variant of that first instance may further include configuring the transport driver to recognize receipt of the new write request at a respective emulated storage device corresponding to the respective virtual disk of the additional virtual machine, decode the data payload as the encryption credentials, and transfer the encryption credentials to the first network adapter.

In a second implementation of such a method, instantiating on the virtualized host, by the hypervisor, an additional virtual machine for executing security software may include instantiating on the virtualized host, by the hypervisor, an additional virtual machine for executing virtual private network software.

In accordance with implementations of the subject matter of this disclosure, a computer system includes a computing device, at least one external storage device, a first network adapter coupled to the computing device, and a respective second network adapter coupled to each of at least one external storage device, the first network adapter and each respective second network adapter being coupled as a storage area network. A virtualized host is instantiated on the computing device by a hypervisor, the virtual network including at least a first virtual machine. The first network adapter and the second network adapter are configured to establish an encrypted channel between themselves for use by any virtual machine of the at least one virtual machine to communicate to an external storage device of the at least one external storage device. An additional virtual machine for executing security software is instantiated on the virtualized host, by the hypervisor. At least one emulated storage device associated with the additional virtual machine is instantiated on the hypervisor. A respective virtual disk corresponding to each of the at least one emulated storage device is instantiated at the additional virtual machine. The additional virtual machine is configured to, for a downstream message from the additional virtual machine to the first network adapter, encode the downstream message as a data payload of a write request, and direct the write request from the additional virtual machine to the respective virtual disk corresponding to a respective emulated storage device of the at least one emulated storage device. A transport driver at the hypervisor is configured to recognize receipt of the write request at the respective emulated storage device, decode the data payload as the downstream message, and transfer the downstream message to the first network adapter. The transport driver is configured to, for an upstream message from the first network adapter to the additional virtual machine, receive the upstream message from the first network adapter, and encode the upstream message as a data payload of a response to a read request by the additional virtual machine to the respective virtual disk. The additional virtual machine is configured to read the response, and decode the data payload of the response.

In a first implementation of such a computer system, the hypervisor may be configured to queue, in advance, at least one empty read request from the additional virtual machine, to the respective virtual disk, for transferring an upstream message subsequently originated by the first network adapter.

According to a first aspect of that first implementation, the additional virtual machine may be configured to direct a request to the hypervisor to establish the encrypted channel to the external storage device of the at least one external storage device, and the transport driver may be configured to recognize the secure storage access request, and to instruct the first network adapter, via the transport driver, to establish the encrypted channel between the first network adapter and the second network adapter, by directing a credential request from the first network adapter to the security software on the additional virtual machine for encryption credentials to establish the encrypted channel, encoding by the transport driver of the credential request as a data payload of a response to an empty read request of the at least one empty read request, and sending, by the transport driver, the response to the empty read request of the at least one empty read request.

In a first instance of that first aspect, the additional virtual machine may further be configured to read the response, decode the data payload of the response, generate the encryption credentials, encode a message containing the encryption credentials as a data payload of a new write request, and direct the new write request to the respective virtual disk of the additional virtual machine.

In a variant of that first instance, the transport driver may further be configured to recognize receipt of the new write request, decode the data payload as the encryption credentials, and transfer the encryption credentials to the first network adapter.

In a second implementation of such a computer system, the additional virtual machine that is instantiated on the virtualized host for executing security software may be instantiated on the virtualized host for executing virtual private network software.

In a third implementation of such a computer system, the virtual network may be VMware® vSphere® virtualization software.

In a fourth implementation of such a computer system, the hypervisor may be ESXi™.

In a fifth implementation of such a computer system, the security software may be an IPsec-based virtual private network.

According to an aspect of that fifth implementation, the security software may be a strongSwan IPsec-based virtual private network.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

As noted above, a virtualized host partitions the resources of a computer system into multiple logical units ("virtual machines") or tenants that could share the underlying hardware and yet operate independently without the awareness of sharing physical resources with other tenants. When a virtualized host is connected to a SAN, the hypervisor may connect a plurality of guest tenants (virtual machines) to a plurality of target storage devices connected to the SAN. Inasmuch as a Type 1 hypervisors is designed to host multiple tenants (virtual machines), each of which could run its own guest operating system that runs all of the application workload, a Type 1 hypervisor may not carry a full-support user space to host applications directly.

It is increasingly common to require encryption of data traffic between a computing device and a target storage device in a networked storage environment. While such encryption of data in flight (EDIF) typically is performed by the host bus adapter that establishes the link between the computing device and the target device, such encryption typically requires security software, such as an IPsec-based virtual private network, to configure credentials (e.g., keys) in advance for the secure link or session, as well as to attend to various housekeeping functions related to the link or session. Execution of such security software typically requires a standard operating system, and the software generally cannot be executed on the hypervisor that contains the storage drivers.

In accordance with implementations of the subject matter of this disclosure, encryption of data in flight in a virtual network environment (which includes a virtual network combined with a SAN) may be accomplished by instantiating an additional virtual machine, with a standard operating system, to execute the required security software. That additional virtual machine may be referred to hereafter as an "EDIF virtual machine." In some implementations, the security software is an IPsec-based virtual private network, such as the strongSwan OpenSource IPsec implementation.

However, as previously noted, a hypervisor generally is not a standard operating system. Generally, a hypervisor will not provide a channel between the user space of the EDIF virtual machine that executes the security software and the storage driver that controls the host bus adapter to maintain hardware abstraction. Therefore, there generally would not be a mechanism to communicate encryption keys and other security-authentication-related configuration data from the EDIF virtual machine to the storage driver that controls the host bus adapter.

Implementations of the subject matter of this disclosure provide the necessary mechanisms to communicate security-authentication information units (IUs) from the storage driver to the EDIF virtual machine so that the security software can configure the necessary encrypted links or sessions between the storage driver that controls the host bus adapter and the storage device or devices, and to communicate encryption keys, and other configuration data for the encrypted link or session, from the EDIF virtual machine to the storage driver.

Thus, for example, in implementations where the transport protocol is Fibre Channel, a Fibre Channel driver is instantiated in the hypervisor which enumerates external storage devices exposed to the virtualized host. The hypervisor manages these enumerated storage devices and can map them as virtual disks to individual virtual machines for their use. In another implementation, the hypervisor may reserve such storage devices for its own use. In either case, when read or write requests to such a storage device is initiated (either to a virtual disk within the virtual machine or to a storage device managed by the hypervisor), the requests are routed to the storage driver which transports them to the external storage devices.

In accordance with the subject matter of this disclosure, emulated storage devices are created by the storage (e.g., Fibre Channel) driver. Those emulated devices are exposed to the hypervisor system, which assumes that the emulated devices are storage devices—e.g., disk drives operating according to the Small Computer System Interface (SCSI) protocol. For example, the hypervisor may be, e.g., the ESXi™ hypervisor provided by VMWare, Inc. The emulated SCSI devices or disks are mapped to the EDIF virtual machine as regular "virtual disks' using mapping resources of the hypervisor (e.g., Raw Device Mapping, or RDM, in the case of an ESXi™ hypervisor).

The virtual disks mapped to the emulated devices are enumerated by the guest operating system running within the EDIF virtual machine, which treats the virtual disks like any storage device with which the operating system may conduct read/write operations. Thus, from the perspectives of both the operating system of the EDIF virtual machine (e.g., Linux VM), and the hypervisor (e.g., EsXi™), when the EDIF virtual machine performs a strongSwan operation resulting in keys or other configuration data for a secure link to a target medium, the operating system of the EDIF virtual machine passes those configuration data as an apparent read/write request to one or more of the enumerated virtual disks. Based on the aforementioned mapping, the apparent read/write requests are sent to the hypervisor, which in turn passes the requests down to the storage transport driver that enumerated the emulated devices, to be sent as SCSI read/write operations over the fabric to the host bus adapter (normally used for transfer to or from a hardware medium). However, instead of sending the data to a (non-existent) hardware medium, the storage transport driver in the hypervisor, in accordance with the subject matter of this disclosure, decodes the read/write requests and interprets them as strongSwan messages, and takes the appropriate action to configure the secure link or session.

Once the secure links or sessions have been configured, requests from the hypervisor or one of its tenant virtual machines are treated normally, with read or write requests from a guest virtual machine passing through the hypervisor being sent to the storage protocol (e.g., Fibre Channel) driver. The driver in turn pushes the requests to the host bus adapter, where the read/write requests are directed to the actual storage devices to which they are addressed. The only difference from normal operation for requests from tenant virtual machines is that with the secure links or sessions having been configured, the data is encrypted in flight, rather than traveling unencrypted.

However, write requests directed by the EDIF virtual machine to the aforementioned emulated devices are interpreted by the storage protocol driver as commands related to the security software and executed accordingly (e.g., setting up keys, removing encryption from a channel, etc.). Similarly, the storage protocol driver can send asynchronous data to the EDIF virtual machine in the form of apparent data reads from the aforementioned virtual SCSI devices. To the extent that a read request has to have come from the EDIF virtual machine, empty read requests can be queued in advance and used to send data (e.g., acknowledgments of authentication or configuration commands) to the EDIF virtual machine when necessary.

Figure 1:
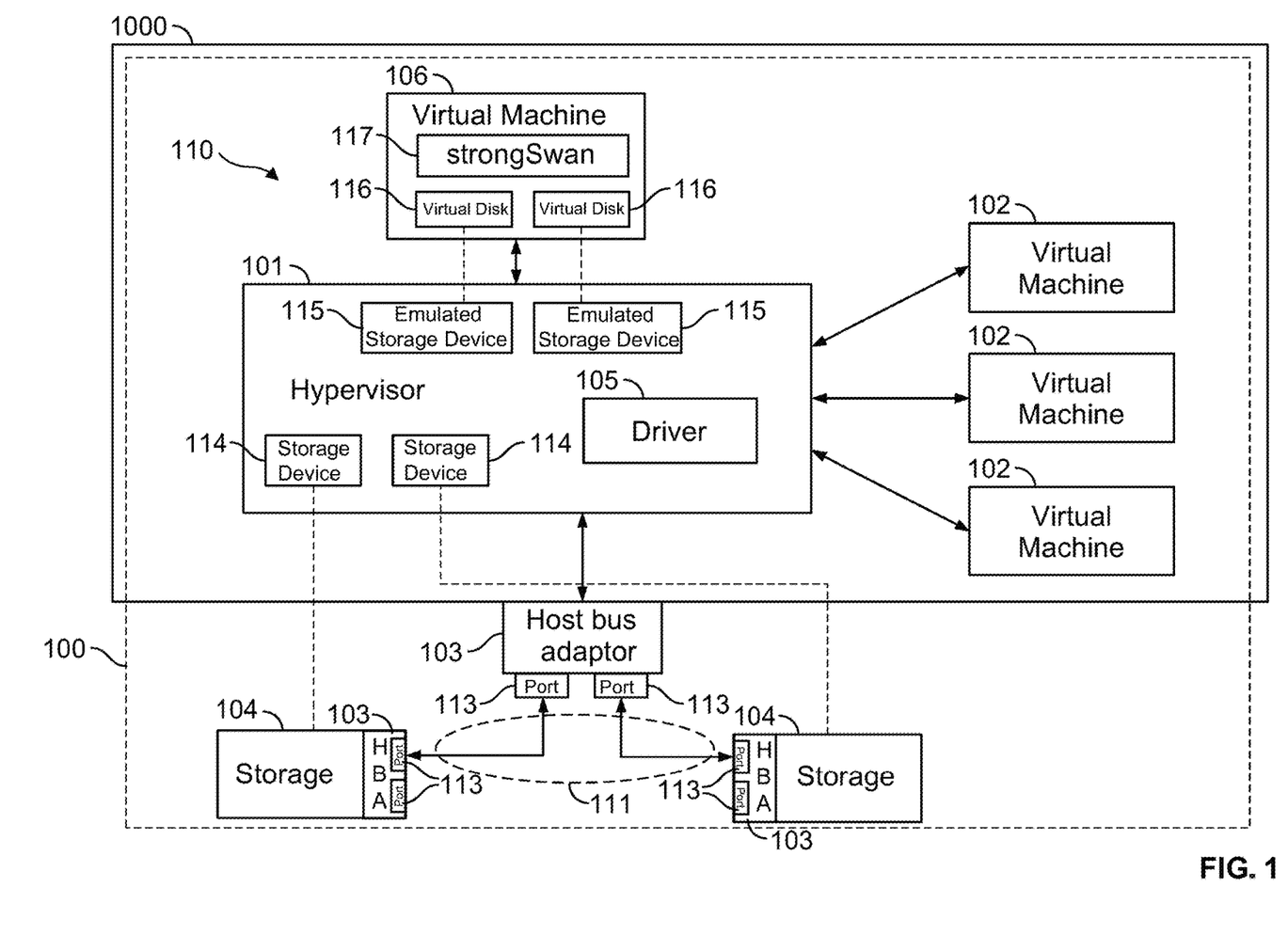
FIG. 1 is a simplified representation of a virtual network environment that may incorporate implementations of the subject matter of this disclosure.
Figure 2:
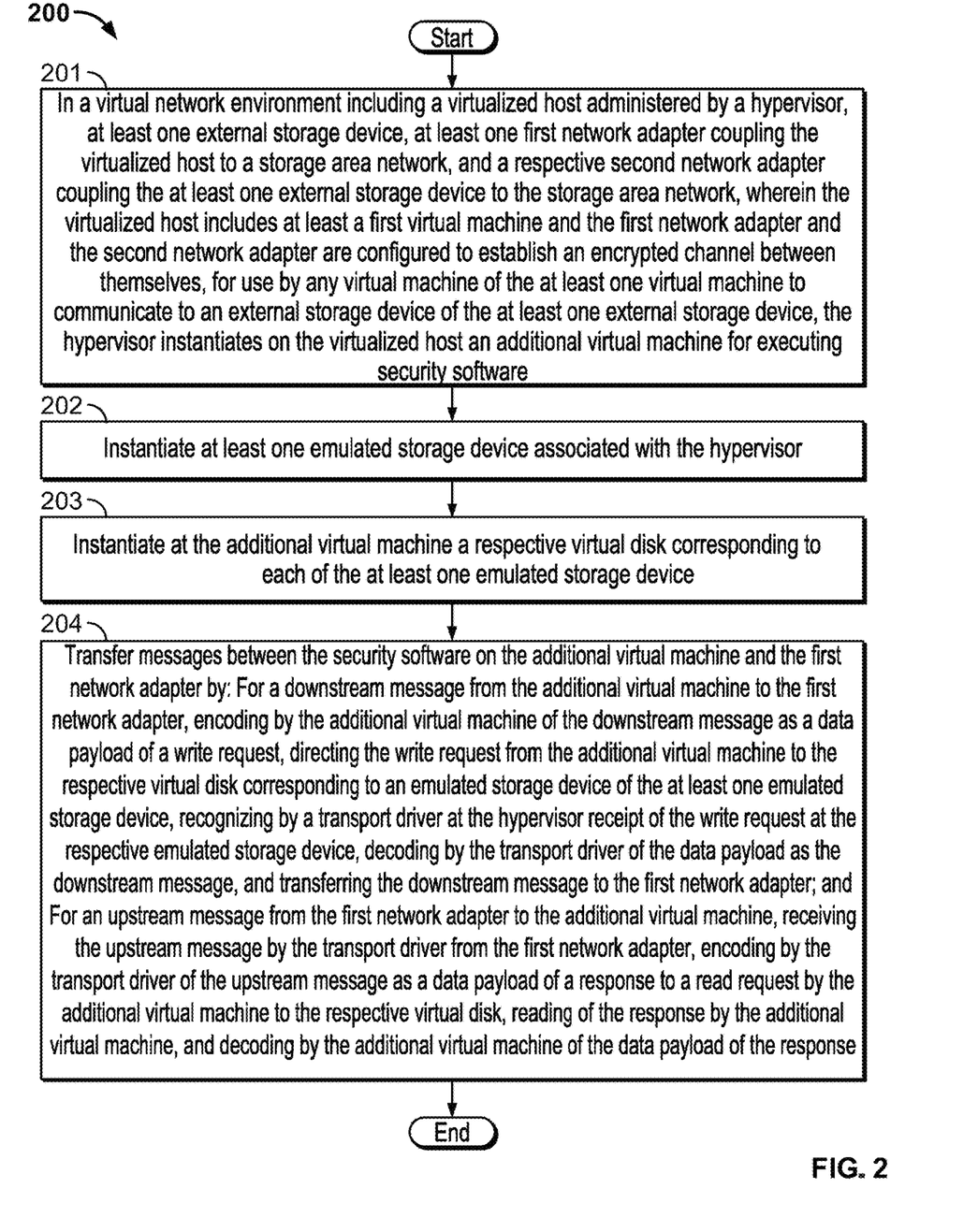
FIG. 2 is a flow diagram illustrating a method in accordance with implementations of the subject matter of this disclosure FOR managing an encrypted channel in a virtual network environment.
Figure 3:
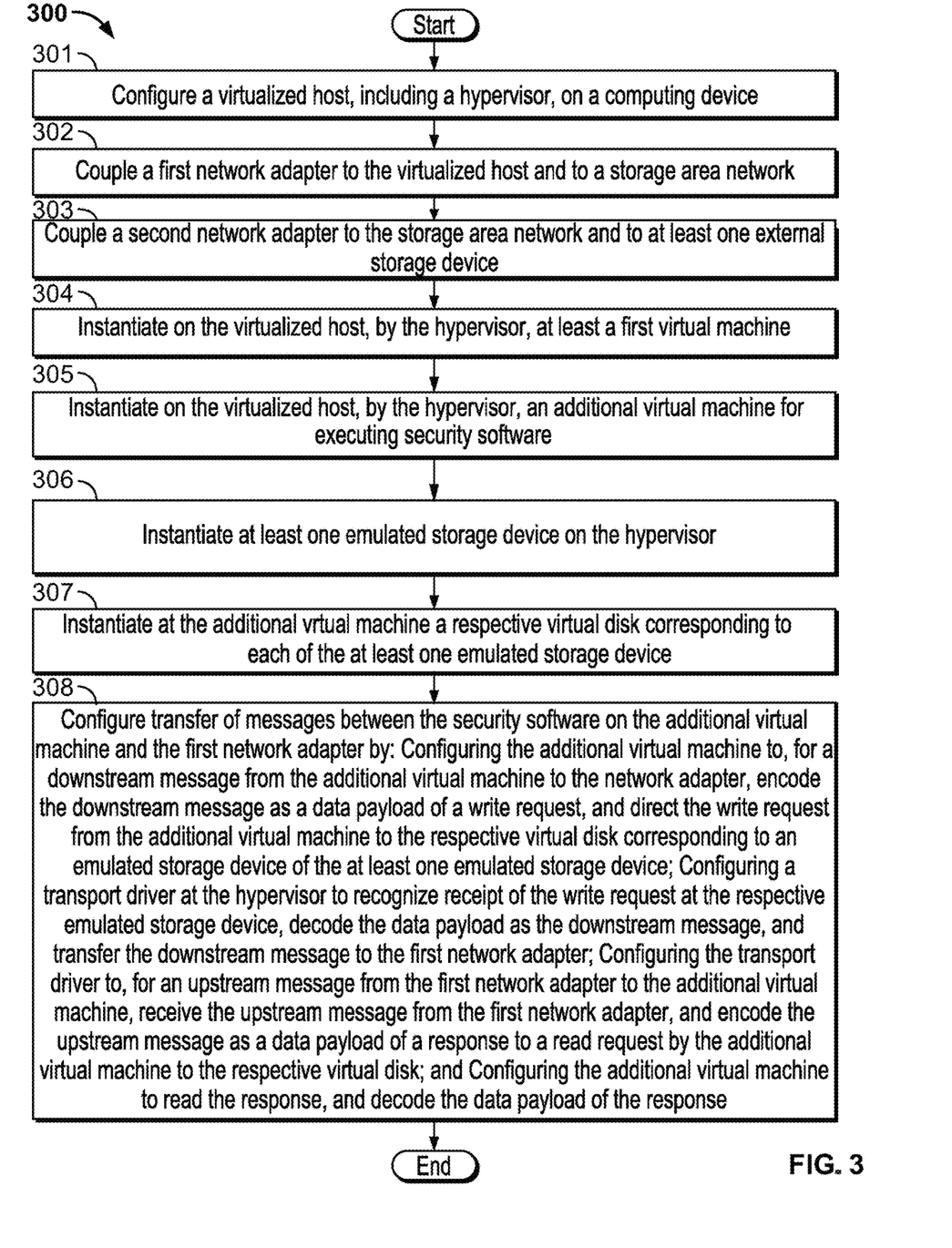
FIG. 3 is a flow diagram illustrating a method in accordance with implementations of the subject matter of this disclosure for configuring a computer system.

The subject matter of this disclosure may be better understood by reference to FIGS. 1-3.

FIG. 1 is a simplified representation of a virtual network environment 100 that may incorporate implementations of the subject matter of this disclosure, and includes a virtualized host 110 is administered by a hypervisor 101 running on a real host machine 1000. The virtualized host 110 in some implementations may be based on Vmware® vSphere® virtualization software available from VMware, Inc., and hypervisor 101 may be an EsXi™ hypervisor. Virtualized host 110 includes a plurality of user guest virtual machines 102 coupled via hypervisor 101 to a host bus adapter 103 (having ports 113) of host machine 1000. External storage devices 104, each of which may include one or more logical storage units (individual storage drives or partitions of a single storage drive), have their own host bus adapters 103 (having ports 113. Virtualized host 110 and storage devices 104 are coupled to a SAN 111 by their respective host bus adapters 103. Although illustrated with a point-to-point topology, SAN 111 may also be formed as a fabric of switches and inter-switch links.

A storage protocol driver 105 is executed by hypervisor 101 to control the transport of read/write requests from user guest virtual machines 102 to external storage devices 104, as well as the transport of data from external storage devices 104 to user guest virtual machines 102 in response to read requests, via host bus adapter 103. In some implementations, storage protocol driver 105 may be a Fibre Channel driver. In practice, storage protocol driver 105 may establish connections with target storage devices 114 and make them available to hypervisor 101, which in turn could either use them internally, or map them as virtual disks to the guest virtual machines 102.

Under the direction of storage protocol driver 105, host bus adapter 103 of virtualized host 110 is capable of encrypting IU traffic originating at any one of user guest virtual machines 102 as the IUs exit from port 113 onto SAN 111. The IUs are decrypted when they reach a host bus adapter 103 of one of storage devices 104. Similarly, in the other direction, data from a storage device 104 is encrypted as it leaves the port 113 of its host bus adapter 103 and is decrypted by host bus adapter 103 of virtualized host 110. To be clear, the secure link or session is established from one HBA 103 to another HBA 103. There is no encryption, for example, within virtualized host 110. If there are secure links or sessions to multiple different target devices, any virtual machine can use any of those links, and for a link to any particular target device, the HBA 103 will use the same encryption key.

However, in order for the host bus adapters 103 to perform that encryption and decryption, the host bus adapters have to be supplied with those encryption keys by suitable security software. Therefore, in accordance with implementations of the subject matter of this disclosure, an additional virtual machine 106 with an operating system, such as Linux, that supports a user space infrastructure to run suitable security software, such as strongSwan IPsec virtual private network software, is instantiated within virtualized host 110 running hypervisor 101, which otherwise would not support running such software.

In establishing additional virtual machine 106, one or more emulated devices 115, enumerated by the storage driver 105 from hypervisor 101, are mapped to one or more virtual disk drives 116, which may appear as SCSI disk drives, associated with additional virtual machine 106. The mapping is established using, e.g., the Raw Device Mapping method, which is one of several mapping mechanisms provided in the ESXi™ hypervisor.

With the foregoing mappings of virtual disks 116 in place, requests from the security software 117 (e.g., the strongSwan IPsec virtual private network software) executing on additional virtual machine 106 to the storage protocol driver 105 can be sent as write requests by additional virtual machine 106 to the emulated devices 115 at driver 105. Similarly, in order to facilitate the sending of data asynchronously by driver 105 to additional virtual machine 106, a plurality of empty read requests, nominally from additional virtual machine 106, can be queued in advance, so that when driver 105 needs to initiate communication with additional virtual machine 106, driver 105 can "reply" to one of those requests.

Examples of requests from the security software 117 may include requests to initiate authentication, including communication of the necessary keys. In particular, where security software 117 is the strongSwan IPsec virtual private network software, the strongSwan application may send a request to indicate its presence to storage driver 105. Storage driver may use a predetermined mechanism to validate that it is communicating with a software entity with which it is authorized to communicate. Once satisfied that communication is authorized, storage driver 105 acknowledges its presence, and passes back information about the HBA port 113 that the virtual device 116 represents. This is done for every HBA port 113 that supports the security protocol. The strongSwan application may then request that the host send a list of storage devices 114 that are connected/enumerated through a given HBA port 113. Storage driver 105 responds with the appropriate data. With this data in hand, the strongSwan application may start the authentication process, which may involve multiple transactions between each host and target to determine if the target supports encryption, and if it does, going through the authentication process all the way to establish a secure session. There also may be appropriate procedures for handling target devices going missing, and the strongSwan application stopping.

Methods as discussed above may be understood by reference to FIGS. 2 and 3.

FIG. 2 is a diagram of a method 200 of managing an encrypted channel in a virtual network environment including a virtualized host administered by a hypervisor, at least one external storage device, at least one first network adapter coupling the virtualized host to a storage area network, and a respective second network adapter coupling the at least one external storage device to the storage area network, wherein the virtualized host includes at least a first virtual machine, and the first network adapter and the second network adapter are configured to establish an encrypted channel between themselves, for use by any virtual machine of the at least one virtual machine to communicate to an external storage device of the at least one external storage device. Method 200 begins at 201 where the hypervisor instantiates on the virtualized host an additional virtual machine for executing security software.

At 202, at least one emulated storage device associated with the hypervisor is instantiated. At 203, a respective virtual disk corresponding to each of the at least one virtual storage device is instantiated at the additional virtual machine.

At 204, messages are transferred between the security software on the additional virtual machine and the first network adapter by (1) for a downstream message from the additional virtual machine to the first network adapter, encoding by the additional virtual machine of the downstream message as a data payload of a write request, directing the write request from the additional virtual machine to the respective virtual disk corresponding to a respective emulated storage device of the at least one emulated storage device, recognizing by a transport driver at the hypervisor receipt of the write request at the respective emulated storage device, decoding by the transport driver of the data payload as the downstream message, and transferring the downstream message to the first network adapter, and (2) for an upstream message from the first network adapter to the additional virtual machine, receiving the upstream message by the transport driver from the first network adapter, encoding by the transport driver of the upstream message as a data payload of a response to a read request by the additional virtual machine to the respective virtual disk, reading of the response by the additional virtual machine, and decoding by the additional virtual machine of the data payload of the response, and method 200 ends.

FIG. 3 is a diagram of a method 300 for configuring a computer system. Method 300 starts at 301 where a virtualized host, including a hypervisor, is configured on a computing device. At 302, a first network adapter is coupled to the virtualized host and to a storage area network. At 303, a second network adapter is coupled to the storage area network and to at least one external storage device. At 304, the hypervisor instantiates at least a first virtual machine on the virtualized host. At 305, the hypervisor instantiates an additional virtual machine on the virtualized host, for executing security software. At 306, at least one emulated storage device is instantiated at the hypervisor. At 307, a respective virtual disk corresponding to each of the at least one emulated storage device is instantiated at the additional virtual machine.

At 308, the transfer of messages between the security software on the additional virtual machine and the first network adapter is configured by (1) configuring the additional virtual machine to, for a downstream message from the additional virtual machine to the network adapter, encode the downstream message as a data payload of a write request, and direct the write request from the additional virtual machine to the respective virtual disk corresponding to a respective emulated storage device of the at least one emulated storage device, and (2) configuring a transport driver at the hypervisor to recognize receipt of the write request at the respective emulated device, decode the data payload as the downstream message, and transfer the downstream message to the first network adapter, (3) configuring the transport driver to, for an upstream message from the first network adapter to the additional virtual machine, receive the upstream message from the first network adapter, and encode the upstream message as a data payload of a response to a read request by the additional virtual machine to the respective virtual disk, and (4) configuring the additional virtual machine to read the response, and decode the data payload of the response, and method 300 ends.

Thus it is seen that creation of a virtual network that allows mapping of security requests that otherwise could not be routed has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. In a virtual network environment including:
a virtualized host administered by a hypervisor,
at least one first network adapter coupling the virtualized host to a storage area network,
at least one external storage device, and
a respective second network adapter coupling the at least one external storage device to the storage area network, wherein:
the virtualized host includes at least a first virtual machine, and
the first network adapter and the second network adapter are configured to establish an encrypted channel between themselves, for use by any virtual machine of the at least one virtual machine to communicate to an external storage device of the at least one external storage device,
a method of managing the encrypted channel, the method comprising:
instantiating on the virtualized host, by the hypervisor, an additional virtual machine for executing security software;
instantiating at least one emulated storage device associated with the hypervisor;
instantiating at the additional virtual machine a respective virtual disk corresponding to each of the at least one emulated storage device; and
transferring messages between the security software on the additional virtual machine and the first network adapter by:
for a downstream message from the additional virtual machine to the first network adapter, encoding by the additional virtual machine of the downstream message as a data payload of a write request, directing the write request from the additional virtual machine to the respective virtual disk corresponding to a respective emulated storage device of the at least one emulated storage device, recognizing by a transport driver at the hypervisor receipt of the write request at the respective emulated storage device, decoding by the transport driver of the data payload as the downstream message, and transferring the downstream message to the first network adapter; and
for an upstream message from the first network adapter to the additional virtual machine, receiving the upstream message by the transport driver from the first network adapter, encoding by the transport driver of the upstream message as a data payload of a response to a read request by the additional virtual machine to the respective virtual disk, reading of the response by the additional virtual machine, and decoding by the additional virtual machine of the data payload of the response.

2. The method of claim 1 further comprising queuing, in advance, at least one empty read request from the additional virtual machine, to the emulated storage device of the at least one emulated storage device, for transferring an upstream message subsequently originated by the first network adapter.

3. The method of claim 2 further comprising establishing an encrypted channel, between the at least one first network adapter and the respective second network adapter, by:
directing a request from the additional virtual machine to the hypervisor to establish the encrypted channel;
recognizing the request by the transport driver;
instructing the first network adapter, by the transport driver, to establish the encrypted channel;
directing a credential request from the first network adapter to the security software on the additional virtual machine for encryption credentials to establish the encrypted channel;
encoding by the transport driver of the credential request as a data payload of a response to an empty read request of the at least one empty read request; and
sending, by the transport driver, the response to the empty read request of the at least one empty read request.

4. The method of claim 3 further comprising:
reading of the response by the additional virtual machine;
decoding by the additional virtual machine of the data payload of the response;
generating by the additional virtual machine of the encryption credentials;
encoding by the additional virtual machine of a message containing the encryption credentials as a data payload of a new write request;
directing the new write request from the additional virtual machine to the respective virtual disk of the additional virtual machine;
recognizing by the transport driver at the hypervisor receipt of the new write request at a respective emulated storage device corresponding to the respective virtual disk of the additional virtual machine;
decoding by the transport driver of the data payload as the encryption credentials; and
transferring the encryption credentials to the first network adapter.

5. The method of claim 1 wherein instantiating on the virtualized host, by the hypervisor, an additional virtual machine for executing security software, comprises instantiating on the virtual network, by the hypervisor, an additional virtual machine for executing virtual private network software.

6. A method for configuring a computer system, the method comprising:
configuring a virtualized host, including a hypervisor, on a computing device;
coupling a first network adapter to the virtualized host and to a storage area network;
coupling a second network adapter to the storage area network and to at least one external storage device;
instantiating on the virtualized host, by the hypervisor, at least a first virtual machine;
instantiating on the virtualized host, by the hypervisor, an additional virtual machine for executing security software;
instantiating at least one emulated storage device at the hypervisor;
instantiating at the additional virtual machine a respective virtual disk corresponding to each of the at least one emulated storage device; and
configuring transfer of messages between the security software on the additional virtual machine and the first network adapter by:
configuring the additional virtual machine to, for a downstream message from the additional virtual machine to the first network adapter, encode the downstream message as a data payload of a write request, and direct the write request from the additional virtual machine to the respective virtual disk corresponding to a respective emulated storage device of the at least one emulated storage device, configuring a transport driver at the hypervisor to recognize receipt of the write request at the respective emulated storage device, decode the data payload as the downstream message, and transfer the downstream message to the first network adapter, configuring the transport driver to, for an upstream message from the first network adapter to the additional virtual machine, receive the upstream message from the first network adapter, and encode the upstream message as a data payload of a response to a read request by the additional virtual machine to the respective virtual disk, and configuring the additional virtual machine to read the response, and decode the data payload of the response.

7. The method of claim 6 further comprising configuring the additional virtual machine to queue, in advance, at least one empty read request to the respective virtual disk, for transferring an upstream message subsequently originated by the first network adapter.

8. The method of claim 7 further comprising:

configuring the additional virtual machine to direct a request to the hypervisor to establish an encrypted channel to an external storage device of the at least one external storage device; and configuring the transport driver to recognize the secure storage access request, and to instruct the first network adapter, via the transport driver, to establish an encrypted channel between the first network adapter and the second network adapter, by:

directing a credential request from the first network adapter to the security software on the additional virtual machine for encryption credentials to establish the encrypted channel;

encoding by the transport driver of the credential request as a data payload of a response to an empty read request of the at least one empty read request; and sending, by the transport driver, the response to the empty read request of the at least one empty read request.

9. The method of claim 8 further comprising configuring the additional virtual machine to:

read the response;

decode the data payload of the response;

generate the encryption credentials;

encode a message containing the encryption credentials as a data payload of a new write request; and direct the new write request to the respective virtual disk of the additional virtual machine.

10. The method of claim 9 further comprising configuring the transport driver to:

recognize receipt of the new write request at a respective emulated storage device corresponding to the respective virtual disk of the additional virtual machine;

decode the data payload as the encryption credentials; and transfer the encryption credentials to the first network adapter.

11. The method of claim 6 wherein instantiating on the virtualized host, by the hypervisor, an additional virtual machine for executing security software comprises instantiating on the virtualized host, by the hypervisor, an additional virtual machine for executing virtual private network software.

12. A computer system comprising:

a computing device;

at least one external storage device;

a first network adapter coupled to the computing device; and a respective second network adapter coupled to each of at least one external storage device, the first network adapter and each respective second network adapter being coupled as a storage area network; wherein:

a virtualized host is instantiated on the computing device by a hypervisor, the virtualized host including at least a first virtual machine;

the first network adapter and the second network adapter are configured to establish an encrypted channel between themselves for use by any virtual machine of the at least one virtual machine to communicate to an external storage device of the at least one external storage device;

an additional virtual machine for executing security software is instantiated on the virtualized host, by the hypervisor;

at least one emulated storage device associated with the additional virtual machine is instantiated on the hypervisor;

a respective virtual disk corresponding to each of the at least one emulated storage device is instantiated at the additional virtual machine;

the additional virtual machine is configured to, for a downstream message from the additional virtual machine to the first network adapter, encode the downstream message as a data payload of a write request, and direct the write request from the additional virtual machine to the respective virtual disk corresponding to a respective emulated storage device of the at least one emulated storage device;

a transport driver at the hypervisor is configured to recognize receipt of the write request at the respective emulated storage device, decode the data payload as the downstream message, and transfer the downstream message to the first network adapter;

the transport driver is configured to, for an upstream message from the first network adapter to the additional virtual machine, receive the upstream message from the first network adapter, and encode the upstream message as a data payload of a response to a read request by the additional virtual machine to the respective virtual disk; and the additional virtual machine is configured to read the response, and decode the data payload of the response.

13. The computer system of claim 12 wherein the hypervisor is configured to queue, in advance, at least one empty read request from the additional virtual machine, to the respective virtual disk, for transferring an upstream message subsequently originated by the first network adapter.

14. The computer system of claim 13 wherein:

the additional virtual machine is configured to direct a request to the hypervisor to establish the encrypted channel to the external storage device of the at least one external storage device; and the transport driver is configured to recognize the secure storage access request, and to instruct the first network adapter, via the transport driver, to establish the encrypted channel between the first network adapter and the second network adapter, by:

directing a credential request from the first network adapter to the security software on the additional virtual machine for encryption credentials to establish the encrypted channel;

encoding by the transport driver of the credential request as a data payload of a response to an empty read request of the at least one empty read request; and sending, by the transport driver, the response to the empty read request of the at least one empty read request.

15. The computer system of claim 14 wherein the additional virtual machine is further configured to:
   read the response;
   decode the data payload of the response;
   generate the encryption credentials;
   encode a message containing the encryption credentials as a data payload of a new write request; and
   direct the new write request to the respective virtual disk of the additional virtual machine.

16. The computer system of claim 15 wherein the transport driver is further configured to:
   recognize receipt of the new write request;
   decode the data payload as the encryption credentials; and
   transfer the encryption credentials to the first network adapter.

17. The computer system of claim 12 wherein the additional virtual machine that is instantiated on the virtualized host for executing security software is instantiated on the virtualized host for executing virtual private network software.

18. The computer system of claim 12 wherein the virtualized host is instantiated using Vmware® vSphere® virtualization software.

19. The computer system of claim 18 wherein the hypervisor is ESXi™.

20. The computer system of claim 12 wherein the security software is an IPsec-based virtual private network.

21. The computer system of claim 20 wherein the security software is a strongSwan IPsec-based virtual private network.

* * * * *